United States Patent
Skinder et al.

(10) Patent No.: US 10,311,121 B2
(45) Date of Patent: Jun. 4, 2019

(54) VALIDATION AND DELIVERY OF DIGITAL ASSETS

(71) Applicant: Apple Inc., Cupertino, CA (US)

(72) Inventors: Jason A. Skinder, Cupertino, CA (US); Sanjay S. Gadkari, San Jose, CA (US); Alan C. Cannistraro, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 623 days.

(21) Appl. No.: 14/152,971

(22) Filed: Jan. 10, 2014

(65) Prior Publication Data

US 2014/0201164 A1 Jul. 17, 2014

Related U.S. Application Data

(60) Provisional application No. 61/751,770, filed on Jan. 11, 2013.

(51) Int. Cl.
*G06F 17/00* (2006.01)
*G06F 7/00* (2006.01)
*G06F 16/957* (2019.01)
*G06F 21/62* (2013.01)

(52) U.S. Cl.
CPC ........ *G06F 16/957* (2019.01); *G06F 21/6218* (2013.01)

(58) Field of Classification Search
CPC .................. G06F 17/30899; G06F 21/6218
USPC ....................................................... 707/687
See application file for complete search history.

(56) References Cited

U.S. PATENT DOCUMENTS

| | | | | |
|---|---|---|---|---|
| 6,084,168 A | * | 7/2000 | Sitrick | G09B 15/023 84/477 R |
| 7,162,454 B1 | * | 1/2007 | Donner | G06Q 10/02 235/382 |
| 7,191,462 B1 | * | 3/2007 | Roman | H04N 7/17318 348/E7.071 |

(Continued)

FOREIGN PATENT DOCUMENTS

WO 2007/024380 A2 3/2007

OTHER PUBLICATIONS

Kafasis, Paul, "Amazon AutoRip," One Foot Tsunami [online], Jan. 10, 2013, [retrieved on Feb. 12, 2014], retrieved from the Internet: URL:http://onefoottsunami.com/2013/01/10/amazon-autorip/, 2 pages.

*Primary Examiner* — Pavan Mamillapalli
(74) *Attorney, Agent, or Firm* — Morgan, Lewis & Bockius LLP (57) ABSTRACT

Systems and methods for determining ownership of an asset and providing access to alternate versions of the asset are provided. A system and method can include associating a unique identifier with an asset stored in one or more locations, receiving a request for an asset interaction, validating the request using the unique identifier, determining an asset storage location, identifying whether an enhanced version of the asset is available, and granting the request for an asset interaction when the unique identifier is validated and when the asset storage location is a local storage location. In one aspect, the asset interaction can be with an enhanced version of the asset when an enhanced version of the asset is available.

27 Claims, 7 Drawing Sheets

(56) References Cited

U.S. PATENT DOCUMENTS

| | | | | |
|---|---|---|---|---|
| 8,244,110 B2* | 8/2012 | Toebes | | G06F 21/10 386/323 |
| 8,583,556 B2* | 11/2013 | Dunkeld | | G06Q 10/10 705/51 |
| 8,712,937 B1* | 4/2014 | Bacus | | G06F 16/35 706/20 |
| 8,725,841 B2* | 5/2014 | Sparks | | G06Q 20/123 707/689 |
| 8,903,944 B2* | 12/2014 | Broberg | | H04N 21/47202 709/217 |
| 9,268,734 B1* | 2/2016 | Ward | | G06F 15/0291 |
| 9,633,375 B2* | 4/2017 | Krishnamurthy | | G06Q 30/0269 |
| 2001/0033659 A1* | 10/2001 | Eisenberg | | G06F 21/10 380/203 |
| 2002/0178360 A1* | 11/2002 | Wenocur | | G06Q 10/107 713/170 |
| 2002/0194483 A1* | 12/2002 | Wenocur | | G06Q 10/107 713/185 |
| 2003/0005306 A1 | 1/2003 | Hunt et al. | | |
| 2005/0038707 A1* | 2/2005 | Roever | | G06Q 20/12 705/21 |
| 2007/0043671 A1* | 2/2007 | Dionne | | G06F 21/34 705/51 |
| 2008/0134032 A1* | 6/2008 | Pirnack | | G06Q 30/0222 715/700 |
| 2008/0141317 A1* | 6/2008 | Radloff | | H04N 5/44582 725/87 |
| 2008/0162486 A1 | 7/2008 | Bells et al. | | |
| 2009/0063301 A1* | 3/2009 | Ward | | G06Q 30/06 705/26.8 |
| 2009/0298036 A1* | 12/2009 | Greenspan | | G06F 17/2235 434/317 |
| 2010/0185673 A1* | 7/2010 | Toebes | | G06F 21/10 707/780 |
| 2011/0302065 A1* | 12/2011 | Dunkeld | | G06Q 10/10 705/30 |
| 2012/0233031 A1 | 9/2012 | Chang | | |
| 2012/0310762 A1 | 12/2012 | Robbin | | |
| 2012/0311069 A1 | 12/2012 | Robbin | | |
| 2012/0311080 A1 | 12/2012 | Alsina | | |
| 2012/0311081 A1 | 12/2012 | Robbin | | |
| 2012/0323868 A1 | 12/2012 | Robbin | | |
| 2012/0323944 A1 | 12/2012 | Robbin | | |

* cited by examiner

VALIDATION AND DELIVERY OF DIGITAL ASSETS

CROSS-REFERENCES TO RELATED APPLICATIONS

This application is a non-provisional of U.S. Provisional Application No. 61/751,770 filed Jan. 11, 2013, the disclosure of which is incorporated by reference in its entirety.

SUMMARY

In accordance with the teachings provided herein, systems and methods for determining ownership of an asset and providing access to alternate versions of the asset are provided.

In some aspects, a system and method can be configured to associate a unique identifier with an asset stored in one or more locations including local storage locations and remote storage locations, to receive a request for an asset interaction, where the request identifies the asset and the associated unique identifier, and validate the request using the unique identifier associated with the asset. Additionally, in some aspects, assets can include media assets and multimedia assets.

In some aspects, validating can include receiving and encoding an image associated with the asset, generating a unique identifier using the encoded image, and matching the generated unique identifier to the unique identifier associated with the asset. Additionally, validating can include activating and associating a sale identifier with the asset for a pre-determined or limited duration of time, and matching the sale identifier to the unique identifier associated with the asset. Moreover, validating can include determining a geographical location corresponding to the request.

In some aspects, the system and method can be configured to determine whether an asset is stored locally or remotely, identify whether an enhanced version of the asset is available, and grant the request for an asset interaction with an available enhanced version of the asset when the unique identifier is validated and when the asset is stored locally. In some aspects, an enhanced version can be an upgrade corresponding to the quality of the asset. In other aspects, an enhanced version can include additional data associated with the asset. Additionally, in some aspects, the system and method can determine whether the asset is only stored in a remote storage location, and whether the asset can be uploaded to a local storage location.

In some aspects, the system can include a kiosk. In these aspects, the system and method can be configured to receive a request from a kiosk, receive a sale identifier from the kiosk, match the sale identifier to the unique identifier associated with the asset, and transmit a copy of the asset.

Particular embodiments of the subject matter described in this specification can be implemented to realize one or more of the following advantages. Determining proof of ownership corresponding to a version of an asset can facilitate access to the asset or alternate versions of the asset. Alternate versions can be enhanced or upgraded versions of an asset.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
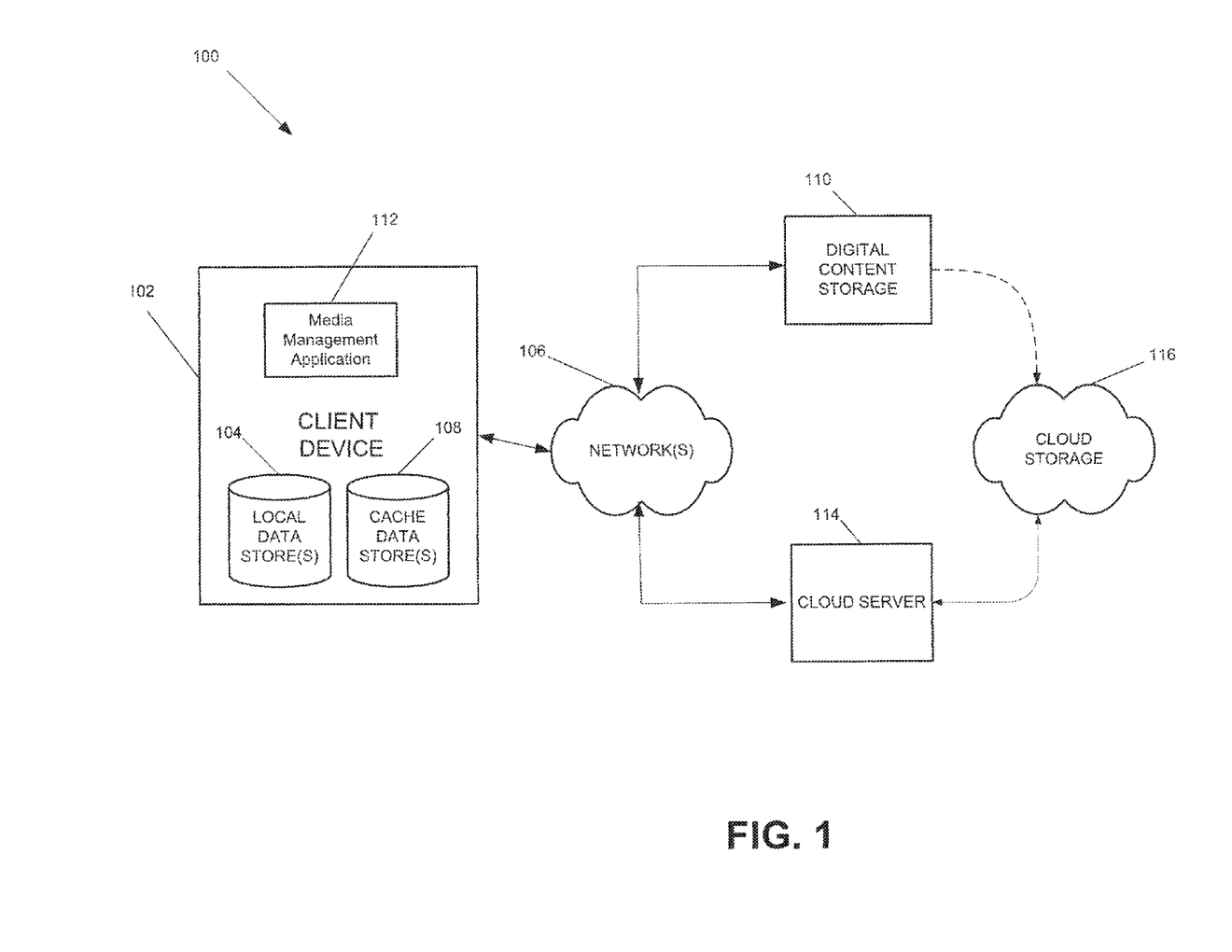
FIG. 1 shows an example system for storing, delivering, and accessing media and non-media assets.

FIG. 1 shows a block diagram of an example system 100 for storing, delivering, and accessing digital data (e.g., media and non-media assets). System 100 can include one or more client devices 102. A client device 102 can facilitate access to digital data. Digital data can be media assets (e.g., digital media items or digital content), and can include video items (e.g., video files or movies), audio items (e.g., audio files or audio tracks, such as for songs, musical albums, podcasts, or audio books), or image items (e.g., photos). Digital media assets can also include or be supplemented by text or multimedia files.

Digital data can be stored locally using a local data store 104 or a cache data store 108. Digital data can also be stored remotely using a remote data store (e.g., cloud storage 116). Remotely stored digital data can be accessed using one or more networks 106. Management of and access to digital data can be synchronized among client devices (e.g., devices such as client device 102).

Client device 102 can be coupled to a network 106. The network 106 can facilitate access to cloud storage 116 by client device 102. Client device 102 can be any type of electronic device capable of interaction with digital data. For example, client device 102 can be a computing device (e.g., personal computer), a mobile phone (e.g., cellular phone, smart phone), a personal digital assistant (PDA), a media player (e.g., music, videos, games, images), a media storage device, a tablet, a camera, and/or the like. Client device 102 can also be a multi-functional device that combines two or more device functionalities into a single device. Client device 102 can support various types of network communications.

Client device 102 can include software capable of facilitating access to cloud server 114 through network 106. For example, client device 102 can include a media management application 112 that facilitates access, presentation, and utilization of data stored either locally at client device 102 or remotely at cloud storage 116. Alternatively, client device 102 can include a utility or operating system program capable of facilitating access to cloud server 116 through network 106. Network 106 can consist of one or more wired or wireless networks, and client device 102 can be connected to network 106 using a wired or wireless connection.

System 100 can also include digital content store 110. Digital content store 110 can facilitate electronic commerce (e.g., rent, purchase, or otherwise acquire digital data). For example, digital content store 110 can be an online store that offers digital data (e.g., digital content for rent, purchase, or utilization). Interaction with digital content store 110 can result in digital data being downloaded to client device 102, cloud storage 116, or both. Alternatively, a link to purchased digital data can be generated and downloaded to client device 102, cloud storage 116, or both. In some implementations, digital data (or a link to digital data), can be accessed directly from cloud storage 116, by any authenticated user using any authorized device (e.g., client device 102).

Digital data can be stored hierarchically within system 100 (e.g., within local storage 104, cache storage 108 or cloud storage 116). Local storage 104 can be data storage on a client device, such as client device 102. Cache storage 108 can be temporary data storage that is maintained in anticipation of future usage. For example, cache storage 108 can be temporary data storage on a client device, such as client device 102. In this example, a block of memory on client device 102 can be allocated as cache storage 108. In some implementations, digital data stored in local storage 104 or cache storage 108, can be accessed using an application program (e.g., media management application 112), operating on client device 102. In these implementations, digital data can be read from local storage 104 or cache storage 108 and played on client device 102 without any need for a network connection (wired or wireless).

Cloud storage 116 can be remote from client device 102 but accessible through one or more computer networks 106 (e.g., the Internet). In some implementations, cloud storage 116 can provide data storage for a plurality of participating (e.g., registered) users, each user having an isolated portion of cloud storage 116. Access to digital data stored in cloud storage 116 can be limited according to user privileges or device privileges. System 100 can include one or more cloud servers 114. Cloud server 114 can be coupled to cloud storage 116. Cloud server 114 can manage access to and distribution of digital data stored in cloud storage 116.

In some implementations, digital data is stored in cloud storage 116 (but is not stored in local storage 104 or cache storage 108). In these implementations, the digital data can be transmitted from cloud storage 116 to local storage 104 and temporarily stored (e.g., for the duration of an access session). In some implementations, digital data can be transmitted from cloud storage 116 to cache storage 108. Digital data in cache storage 108 can be replaced by other data according to a pre-determined policy (e.g., a First-In-First-Out (FIFO) caching policy, popularity policy, most recently played policy, or other policy). Digital data in cache storage 108 can be repeatedly played without additional downloading. Additionally, performance of digital data in cache storage 108 is improved because the digital data is locally available and thus the electronic device does not need to consume electrical power to download the data file (which is particularly advantageous with battery-powered electronic devices).

Digital data can be retrieved and played by a data playback device, such as a computing device, a multi-function consumer electronic device (e.g., smart phone), or other client device. Commands for retrieving and playing digital data can be executed using a graphical user interface. In some implementations, digital data can be managed by a database capable of tracking status information (e.g., location, amount, state and/or type of storage being provided).

Additional information on digital asset delivery is provided in: (i) U.S. patent application Ser. No. 13/171,253, filed Jun. 28, 2011, entitled "INTELLIGENT DELIVERY AND ACQUISITION OF DIGITAL ASSETS," which is herein incorporated by reference, and its corresponding US Patent Publication 2012/0233031 A1 is also hereby incorporated by reference; and (ii) U.S. patent application Ser. No. 11/849,711, filed Sep. 4, 2007, and entitled "Digital Asset Delivery to Different Devices," which is hereby incorporated herein by reference, and its corresponding US Patent Publication 2009/0063301 A1 is also hereby incorporated herein by reference.

Figure 2:
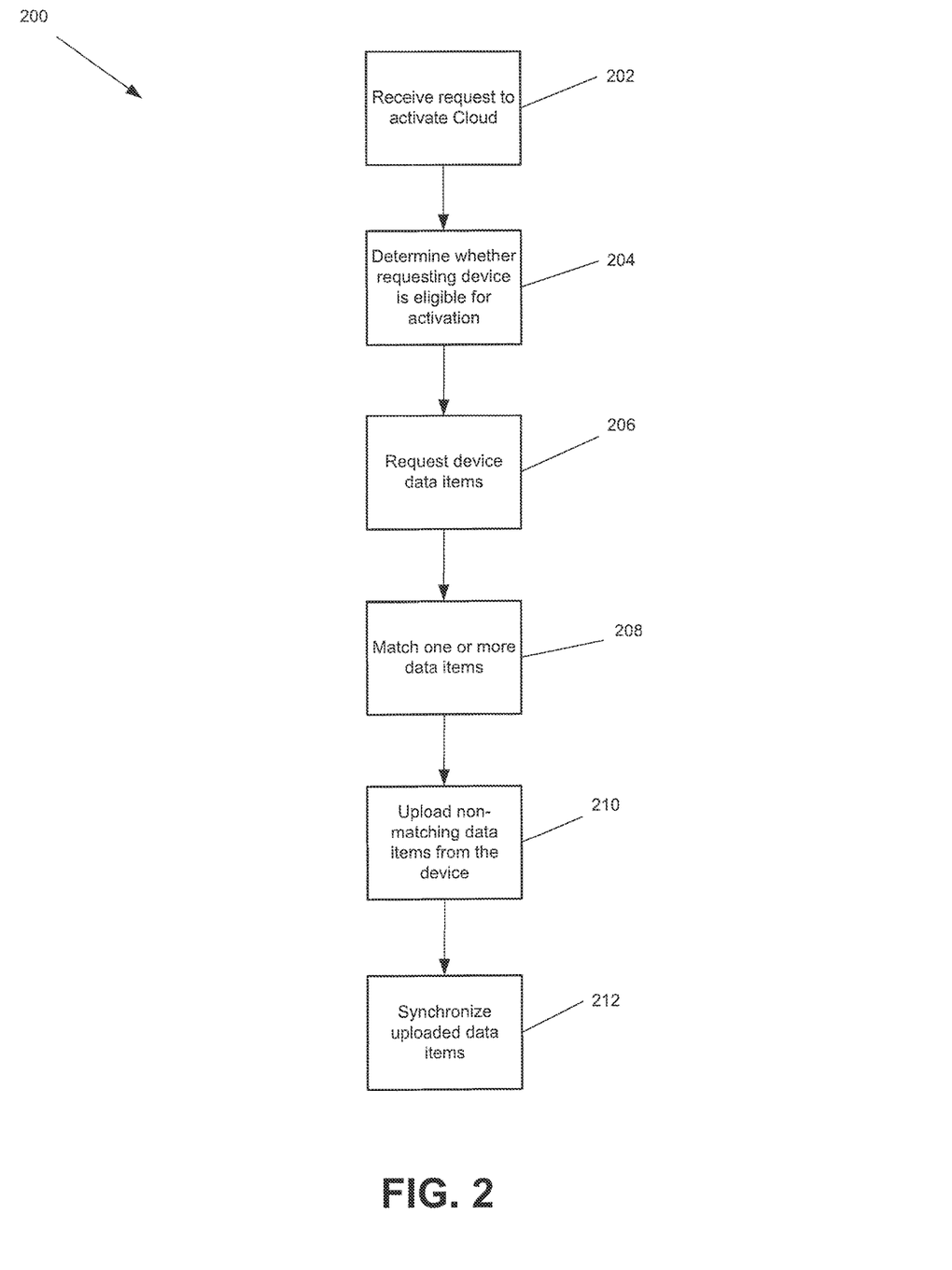
FIG. 2 shows an example block diagram corresponding to a cloud activation process.

FIG. 2 shows an example block diagram corresponding to a cloud activation process 200. The cloud activation process can be used to retrieve digital data (e.g., data items such as media and non-media assets), from a device. In some implementations, the retrieval of digital data can be pre-determined or anticipated (e.g., initiated automatically based upon prior settings or behaviors). In some implementations, the retrieval of digital data can be manual (e.g., initiated based upon a received request). In these implementations, a request 202 for digital data stored in a cloud (e.g., cloud 116), will initiate a cloud activation process. Once the cloud activation process has been initiated, the system determines whether the requesting device is eligible 204 for activation. Eligibility can be established using one or more predetermined rules or policies.

Once eligibility has been determined, one or more (digital) data items can be uploaded (e.g., automatically or upon request 206), to the cloud storage (e.g., cloud storage 116), from the requesting device. In some implementations, energy can be conserved and network bandwidth can be efficiently utilized by only uploading a portion of the data items available on the requesting device.

In these implementations, a data matching process 208 can be used to determine which data item(s) should be uploaded to the cloud storage. For example, one or more data items on a device can be matched 208 using one or more data identifiers. Many types of data identifiers can be used within a system, and each type of data identifier can have a unique and specific meaning within the system. For example, one type of data identifier can be used to determine whether cloud storage already includes an identical or similar data item corresponding to a data item on a requesting device. In this example, if a data item on a device was purchased from an on-line store, then the data item can include one or more unique identifiers, corresponding to the on-line store where the purchase originated. Purchasing data items from an on-line store will be discussed in greater detail below with respect to FIG. 3.

In the present example however, using a data identifier associated with a data item, a cloud server affiliated with an on-line store can determine that the data item is available in cloud storage, and therefore does not need to be uploaded to cloud storage from the device. If the data item is not available in cloud storage, a determination can be made to upload the data item to cloud storage from the device.

In some implementations, additional or alternative matching methods can be used (e.g., when data items on a device cannot be matched using one or more data identifiers). In these implementations, additional matching methods can include determining whether a data item on a device can be matched using a hash value or a fingerprint. For example, a data item can be represented as a hash value that can be compared to one or more hash values stored in cloud storage. Thus, when a data item hash value matches a hash value stored in cloud storage, a determination can be made to not uploaded the data item to cloud storage from the device. Alternatively, when a data item hash value does not match a hash value stored in cloud storage, a determination can be made to upload the data item to cloud storage from the device.

In another example, a pre-determined algorithm can be used to generate a unique electronic fingerprint of a data item. The fingerprint can be generated on a device storing the data item, and used for a comparison with one or more fingerprints stored in cloud storage. Thus, when a data item fingerprint matches a fingerprint stored in cloud storage, the data item is not uploaded to cloud storage from the device. Additionally, when a data item fingerprint does not match a fingerprint stored in cloud storage, a determination can be made to upload the data item to cloud storage from the device.

Data items uploaded 210 from a device can be added to cloud storage, and the cloud activation process can end. In these implementations, the requesting device is determined to be activated and data items on the activated device can be synchronized 212 and accessed by other devices (e.g., other devices associated with the same user or user account). In some implementations, notifications can be used to update cloud storage and to inform other devices of changes to the data. For example, when a new data item is added to a device (e.g., client device 102), the cloud server 114 can update cloud storage 116 (e.g., by assigning a revised data identifier). Additionally, the cloud server can notify other devices (e.g., other devices associated with the same user or user account), of changes to the data items on the device.

Data items can be acquired in many different ways. For example, a previously purchased "hard-copy" of a data item can be credited to one or more devices (e.g., devices associated with the same user or account). Crediting data items (or data assets) will be discussed in greater detail below. In another example, data items can be purchased electronically (e.g., from an on-line store), and downloaded to one or more devices (e.g., devices associated with the same user or account).

Figure 3:
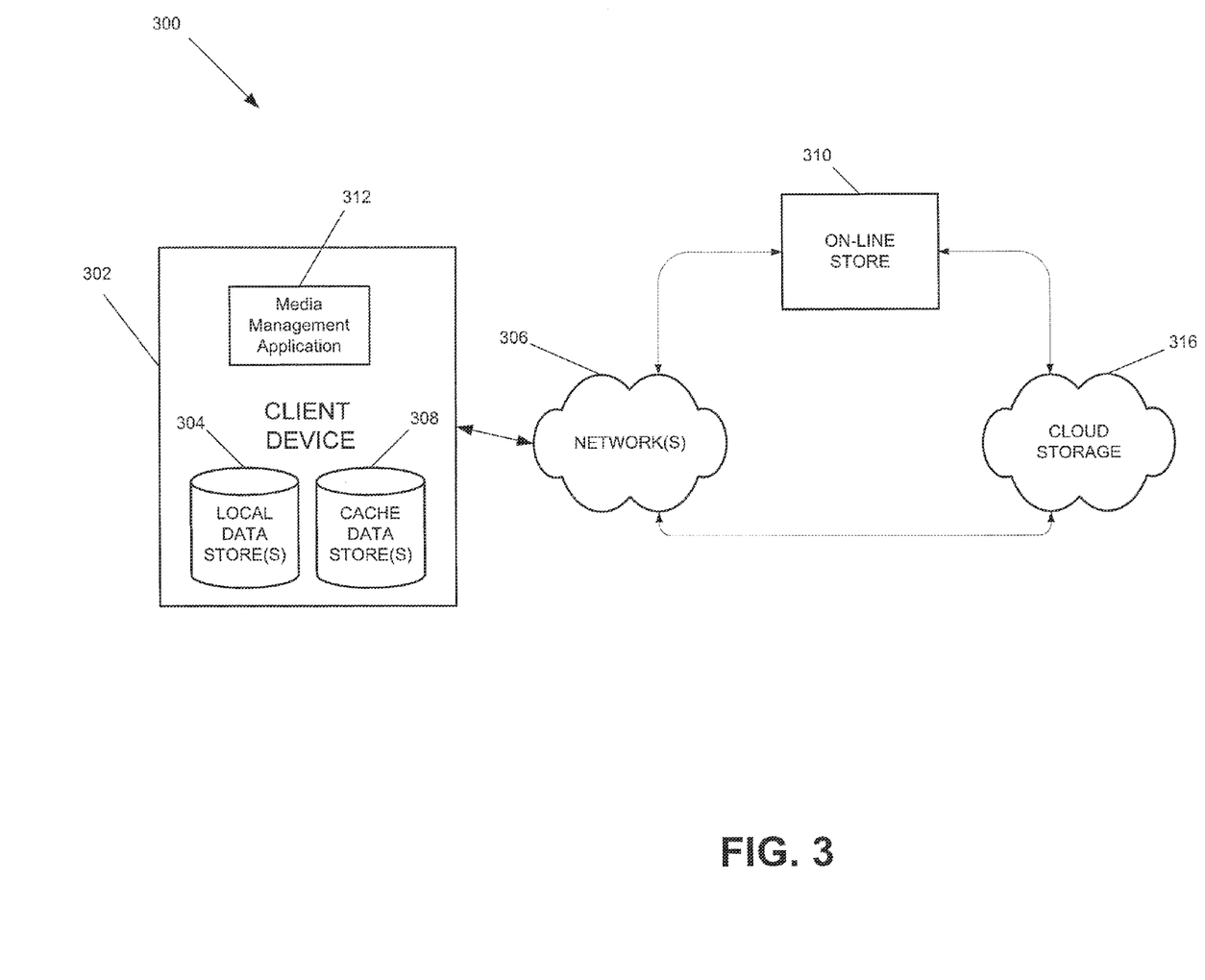
FIG. 3 shows an example system for acquiring data items from an on-line store.

FIG. 3 shows an example system 300 for acquiring data items from an on-line store. In some implementations, data assets acquired from an on-line store can be automatically associated with a unique data identifier (e.g., a cloud ID). In these implementations, a data item and an associated cloud ID can be consecutively or concurrently downloaded to a device. As noted above, other devices (e.g., devices associated with the same user or account), can be updated (e.g., with the data item, the associated cloud ID, or both).

As noted above with respect to system 100 in FIG. 1, system 300 in FIG. 3 can include one or more client devices 302 that can facilitate access to digital data. Digital data can be stored locally using a local data store 304 or a cache data store 308. Digital data can also be stored remotely using a remote data store (e.g., cloud storage 316). Client device 302 can include a media management application 312 that facilitates access, presentation, and utilization of data stored either locally at client device 302 or remotely at cloud storage 316. Remotely stored digital data can be accessed using one or more networks 306. Management of and access to digital data can be synchronized among client devices (e.g., devices such as client device 302).

System 300 can also include a digital content store (e.g., on-line store 310). On-line store 310 can facilitate electronic commerce (e.g., to rent, purchase, or otherwise acquire digital data). Interaction with on-line store 310 can result in digital data being downloaded to client device 302, cloud storage 316, or both. Alternatively, a link to purchased digital data can be generated and downloaded to client device 302, cloud storage 316, or both. In some implementations, data items stored on cloud storage 316 are available and accessible to one or more other devices (e.g., devices associated with the same user or account).

In some implementations, on-line store 310 can request that cloud storage 316 (or a cloud server associated with cloud storage 316), associates a data identifier (e.g., a cloud ID), with a data item (e.g., a data item purchased at on-line store 310). In these implementations, the cloud ID can be a unique data identifier (e.g., unique to a user and the user's account), and thus identifies the data item within cloud storage 316 for the particular user's account. Cloud storage 316 can provide on-line store 310 with the cloud ID associated with the data item. On-line store 310 can provide the cloud ID to one or more client devices associated with the user. Client devices (e.g., client device 302), can include a database capable of storing data items and associated cloud IDs.

For example, when a data item is an album of music, media management application 312 can associate one or more tracks with the album, and the database can store descriptive information and metadata for each of the tracks. Thus, in this example, if the album was purchased from on-line store 310, each track could be automatically associated with a different cloud ID upon purchase. The client device that purchased the album could then receive and store the cloud IDs for each of the tracks. Subsequently, the client device could access one or more tracks on the purchased album by using the cloud IDs. For example, the client device could use the cloud IDs to download the associated tracks (e.g., from cloud storage 316), as needed.

Additional information on management of digital data items is provided in: (i) U.S. Provisional Patent Application No. 61/493,321, filed Jun. 3, 2011, entitled "MANAGEMENT OF NETWORK-BASED DIGITAL DATA REPOSITORY," which is herein incorporated by reference; (ii) U.S. Provisional Patent Application No. 61/525,177, filed Aug. 18, 2011, and entitled "MANAGEMENT OF NETWORK-BASED DIGITAL DATA REPOSITORY," which is hereby incorporated herein by reference; and (iii) U.S. Provisional Patent Application No. 61/525,180, filed Aug. 18, 2011, and entitled "MANAGEMENT OF DOWNLOADS FROM A NETWORK-BASED DIGITAL DATA REPOSITORY," which is hereby incorporated herein by reference.

As noted above, data items can be acquired in many different ways. Ownership of digital data items acquired through an on-line store can be verified using a unique data identifier (e.g., a cloud ID). Ownership of data items uploaded from a previously purchased digital "hard-copy" (e.g., an actual physical CD or a DVD), can also be verified.

For example, a unique data identifier (e.g., a digital ID), can be embedded into the data available on the hard-copy of a digital data item. In this example, when a request is made (e.g., from a client device) for a digital copy (or alternate version) of a hard-copy data item (e.g., a copy of the data item stored in cloud storage), the system can request that the client device provide proof of the hard-copy of the data item (e.g., by placing the CD or DVD in a computer drive). Thus, the system can confirm or verify or validate ownership of the digital hard-copy of the data item by reading the digital ID from the digital hard-copy (the CD or DVD), and matching the digital ID to a stored data identifier (e.g., a stored digital ID) corresponding to a stored digital copy of the data item. In this example, data identifiers, digital copies, and enhanced digital copies, can be stored in cloud storage. Thus, once ownership of a digital hard-copy of a data item is confirmed, alternate versions of the data item can be downloaded (e.g., from cloud storage), to one or more client devices automatically or upon request.

In some implementations, a previously purchased hard-copy of a data item is not originally in digital form. For example, a previously purchased hard-copy of a data item can be a printed copy of a book or manuscript. In these implementations, a verification process can be used to confirm ownership of the hard-copy version.

Figure 4:
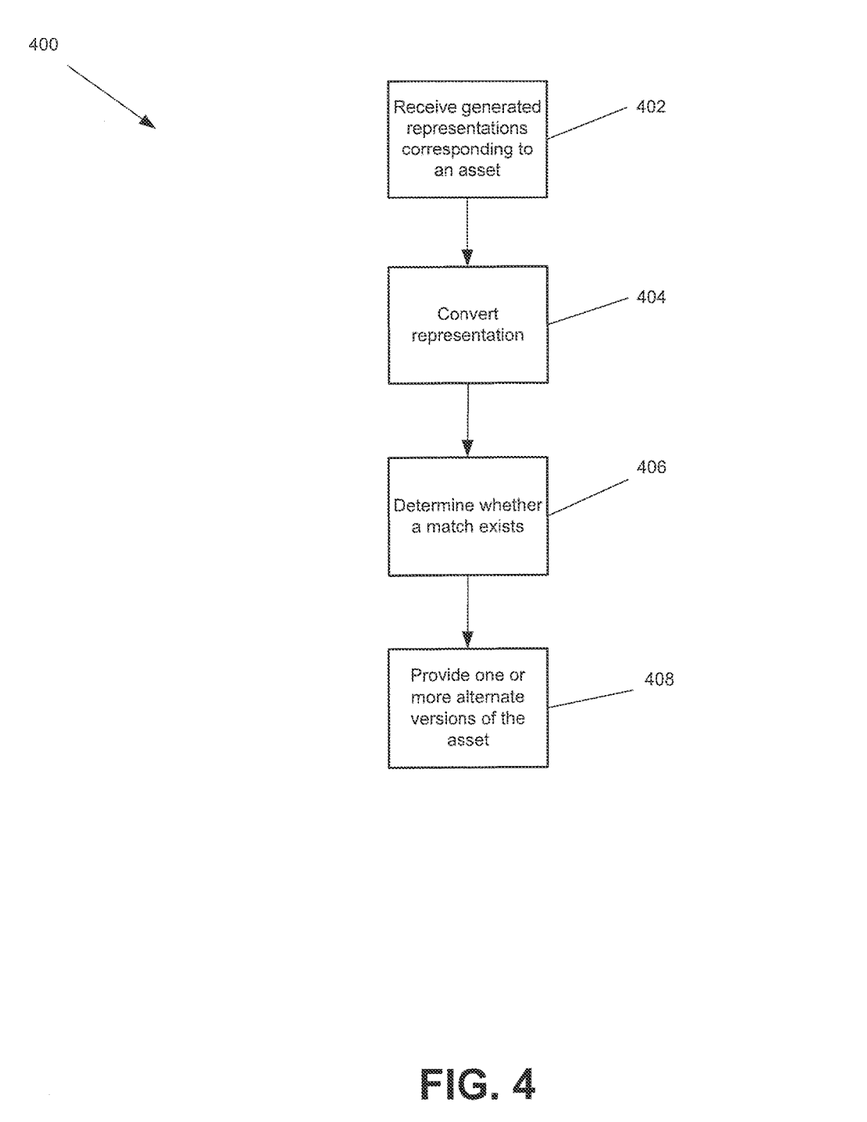
FIG. 4 shows an example block diagram corresponding to a verification process.

FIG. 4 shows an example block diagram corresponding to a verification process 400. Verification process 400 can be used to verify ownership or possession of a data item or asset of any media type (or combination of media types). Media types can include, but are not limited to printed text or manuscripts (e.g., books or scores), videos items (e.g., DVDs or video tapes), audio items (e.g., CDs, cassettes, musical albums, podcasts, or audio books), or image items (e.g., photos).

For description purposes, verification process 400 will primarily be described using a printed text asset, namely a book. However, it should be understood that verification process 400 can be used to verify any asset of any media type (or combination of media types), available in hard-copy form.

Verification process 400 can facilitate granting ownership credit (e.g., in an on-line store), for a hard-copy version of an asset (e.g., a "physical copy" of a book). Ownership credit can be used to facilitate one or more additional actions that can take place automatically (by the system), or manually (upon request). For example, a digital data item (e.g., an electronic publication or "epub"), corresponding to a hard-copy of a book can be provided (e.g., downloaded), automatically or upon request, once ownership credit is established.

In some implementations, verification process 400 can begin when a generated representation corresponding to an asset (e.g., a book, a CD, or a DVD), or an alternate unique data identifier associated with an asset, is received 402 (e.g., from a client device requesting validation of ownership credit or interaction with an alternate version of an asset). A generated representation can be a unique data identifier based upon an image corresponding to a portion of an asset or the entire asset itself. For example, to confirm ownership of a hard-copy of a book, the system can request an image of the front cover of the book, the back cover of the book, the spine of the book, a random page in the book, or an image of a unique number or identifier associated with the book (e.g., a International Standard Book Number (ISBN), a Universal Product Code (UPC) symbol, or a Quick Response (QR) code). In this example, the system can request an image of a different random page for each verification process. The request for each random page can be based upon several factors including the user, the user account, the book, or the version of the book.

Once the image is generated and transmitted to the system, the system can use an image-matching technique (e.g., to determine relative image equality). For example, the system can use Optical Code Recognition ("OCR"), to convert 404 the image of the received text (e.g., into machine-encoded text). The converted text can represent a unique data identifier that can be compared with expected text (e.g., text stored on cloud storage), to determine whether a match exists 406. Thus, the converted text can temporarily uniquely identify an asset and associate that asset with a particular owner. When the system determines that a match exists, the system can validate the request for ownership credit and provide 408 one or more alternate versions of the asset. Providing an alternate version of a matched asset can be done automatically (e.g., using one or more pre-determined settings) or manually (e.g., upon request).

In some implementations, alternate versions of assets can be stored in cloud storage (e.g., locally from the perspective of the system), or in a data store on a client device (remotely from the perspective of the system). In these implementations, the system can determine the location(s) of any alternate version(s) of the asset before providing access to an alternate version of the asset. For example, if an alternate version of an asset already exists remotely (e.g., on the client device requesting ownership credit for the asset), then a duplicate of that alternate version would not be offered to that client device. Thus, when the system determines that an alternate version of an asset is stored locally (in cloud storage), but not remotely (on a client device), the system can provide a copy of that alternate version of the asset to the client device. Alternatively, when the system determines that an alternate version of the asset is only stored remotely (e.g., on a client device), the system can further determine whether the alternate version of the asset can be uploaded to local storage (e.g., cloud storage).

In some implementations, an alternate version can be an upgraded or enhanced version of an asset. In these implementations, an alternate version can include additional content such as audio, video, textual, or multimedia content. Additional content can also be interactive and coordinated with the content of the hard-copy version. One or more alternate versions of an asset (when available), can be provided to a client device once ownership credit for the asset has been determined with respect to that client device.

In some implementations, determining the location of alternate versions of an asset can include identifying whether an alternate version (e.g., an enhanced version or an upgraded version), of the asset is available. In these implementations, the system can grant or allow access to or interaction with an alternate version of an asset when the asset is stored locally (e.g., on client device 102), and an alternate version of the asset is available (e.g., on a cloud server).

In some implementations, the system can determine that a copy of the asset is not stored anywhere on the client device or in the system (e.g., in cloud storage). In these implementations, the system can notify the owner of the asset that no alternate versions of the asset are available. Additionally, the system can request that a version of the asset is generated and provided to the system for storage and future use. For example, when the asset is a book, the pages of the book can be scanned, converted, and transmitted to cloud storage.

In some implementations, different versions (e.g., editions) of a asset (e.g., a book) exist. In these implementations, the system can store one or more versions of the asset with corresponding ISBN numbers. To confirm ownership, the system can request an image of the ISBN number on a book, convert the image, and compare the converted text of the ISBN number with ISBN numbers corresponding to the stored versions of the book. The system can then request an image of a particular page in the book based upon a match between the ISBN number of the book and the ISBN number of a stored version. The system can convert the received image of the particular page, and compare the converted text with expected text in the stored version (having the matching ISBN number), to determine whether a version match exists. When the system determines that a version match exists, then the system can provide 408 one or more alternate versions of the book. The same method can be applied to different versions of other assets (e.g., CDs and DVDs) using a unique number corresponding to that asset.

In some implementations, the system can request a random image corresponding to an asset, convert the image, and hash the image bits to create a unique data identifier (e.g., an asset ID). In some implementations, a converted image is reusable (e.g., for confirming ownership). For example, the system can randomly request and convert an image of a previously requested page (e.g., once every page has been requested once). In contrast, an asset ID can be limited to a single use for purposes of confirming ownership (e.g., of that asset for a particular user or user account). Thus, once an asset ID is used to confirm ownership, that asset ID can become invalidated or inactivated. In some implementations, an asset ID can be used a pre-determined number of times or for a limited duration of time.

For example, when an asset ID is limited to a single use, an image used a first time (e.g., to validate a purchase), would be recognized and rejected when an attempt is made to re-use or use it again. In this example, when a first user generates an image of an asset cover to validate a purchase, the system can recognize the asset and match the asset to a digital copy. When a second user wants to validate a purchase of the same asset, the second user would be required to provide an image of the asset cover which the system would recognize as the image provided by the first user. Additionally, the system would recognize that that hash of the image had already been "redeemed", and thus the asset match would be rejected.

As noted above, when the system determines that a version match exists, then the system can provide 408 one or more alternate versions of an asset. For example, when ownership of a hard-copy version of a book matches an electronic publication or ("ePub") version of that book in an on-line store associated with the system (e.g., an iTunes™ store), the ePub version can be provided to the confirmed owner of the hard-copy version. Similarly, if ownership is confirmed for a pdf or scanned hard-copy version of a book, then an alternate ePub version of that book can be offered or automatically provided for download (e.g., to a client device from the on-line store associated with the system).

In some implementations, once ownership is confirmed for a first version, other versions can be offered or automatically provided for download (e.g., from cloud storage to a client device). For example, if ownership of a hard-copy version or an audio version of a book is confirmed, then an ePub version of the book can also be made available (e.g., to that user or user account). In this example, confirming ownership of an asset can serve to credit the owner with one or more other versions of the asset. Thus, credit can be given for any media type (e.g., a digital audio, digital ePub or a physical copy), when ownership of a first media type is confirmed. In another example, confirming ownership of an asset (e.g., a DVD, Blu-Ray, CD, cassette, vinyl record, VHS tape, or Beta tape), can cause the system to provide access to a digital version of one or more data items on the asset (e.g., a movie or an audio recording), in an on-line store (e.g., the iTunes™ store).

In some implementations, the system can convert and analyze an image depicting multiple assets (e.g., books, DVDs, and CDs). The image can include entire assets or portions of assets. The image can include one or more types of assets (e.g., books, CDs, DVDs). In these implementations, the system can distinguish between individual assets and asset types within the image, and credit can be given for other versions of the assets (e.g., in an on-line store or in cloud storage). In these implementations, the system can include a global positioning system (GPS) capability, to determine the location where the image was generated. Images generated at particular geographic locations (e.g., libraries or bookstores), can be automatically invalidated and thus no credit would be given (e.g., in an on-line store) for assets depicted in those images.

In some implementations, the system can require random combinations of images or data identifiers to confirm ownership. In some implementations, the system can require random re-validation of one or more assets. A re-validation period can be a pre-determined amount of time during which the system can randomly request proof of ownership using one or more of the methods described above.

Figure 5:
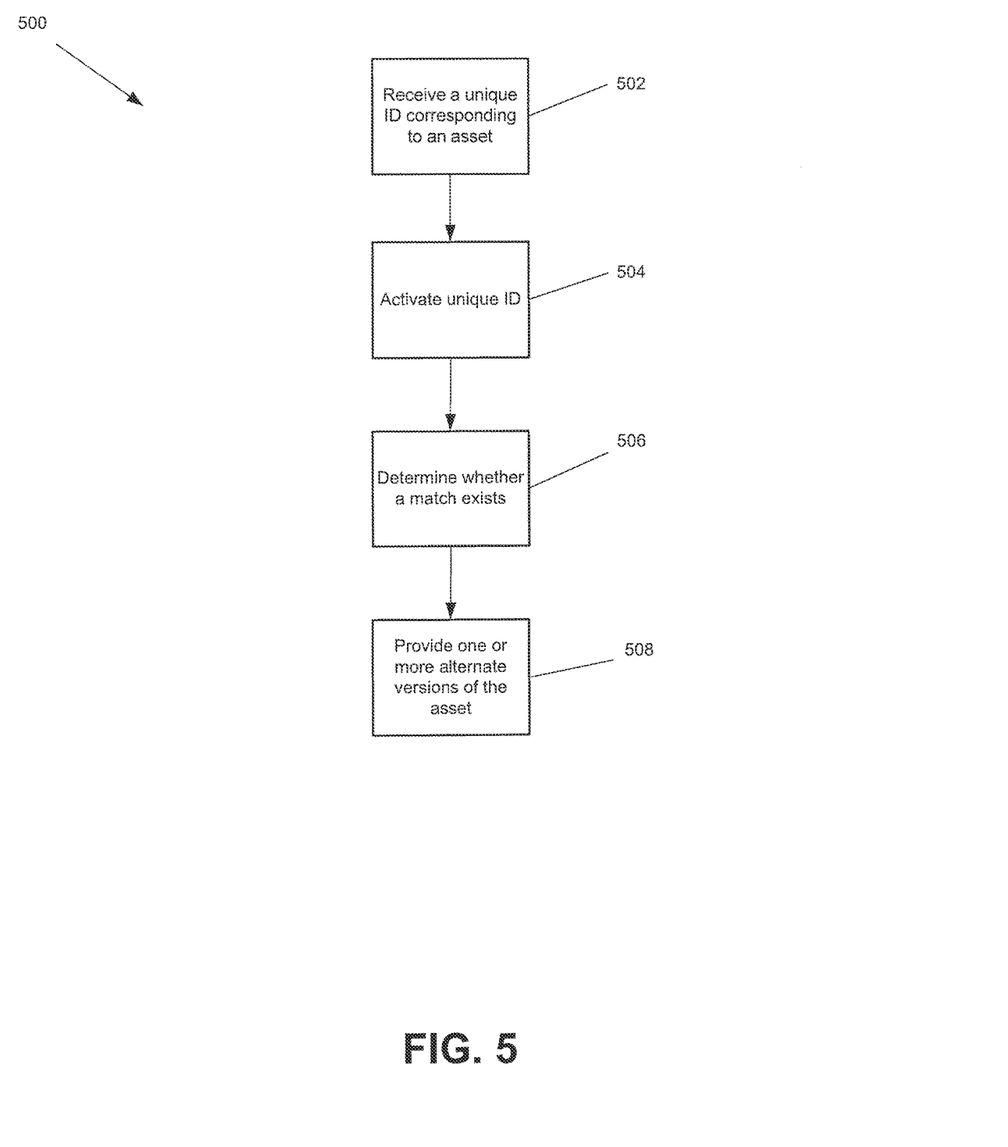
FIG. 5 shows an example block diagram corresponding to another verification process.

FIG. 5 shows an example block diagram 500 corresponding to another verification process. In some implementations, a unique data identifier (e.g., a sale ID) can be imprinted into a hard-copy version of an asset (e.g., on the title page or under an edition number in a book, on the inner cover of a CD or DVD case, or directly on a CD or DVD). In these implementations, the system can require an image of the to determine credit (e.g., in an on-line store). Once the system has received 502 (and converted) the image of the sale ID, the system can activate 504 the sale ID, determine 506 whether a match for the sale ID is stored in the system, and provide 508 an alternate version of the book when a match exists. In some implementations, alternate or enhanced versions of the asset can be provided depending upon availability and location as noted above.

In another example, to determine credit, the system can require that the sale ID is entered directly into the system (e.g., typed). In this example, the system can activate and match the sale ID once it has been entered. In these implementations, a sale ID can be invalidated after a single use, after a pre-determined number of uses, or after a pre-determined amount of time.

In some implementations, the system can request an image of a receipt to confirm ownership. In these implementations, the system can request the receipt alone or in addition to an image of or entry of a sale ID imprinted on the purchased asset (when a sale ID is included with the asset). In some implementations, a sale ID can be imprinted upon a receipt at purchase. In these implementations, to confirm ownership, the system can request an image of the receipt alone. The system can then convert the image of the receipt, use the converted text to determine a match, and provide one or more alternate versions of the asset using the methods described above.

In some implementations, a sale ID can be activated upon purchase (e.g., by a merchant or at a kiosk). For example, a merchant can activate a sale ID upon purchase using an activation device. Once activated, a sale ID can be used (for a limited amount of time or for a limited number of uses), to get credit for alternate versions of the purchased asset.

In some implementations, an asset can include an imbedded radio-frequency identification (RFID) tag. An RFID tag can be scanned and activated (e.g., using an RFID scanner), at the point of sale, or at a later time (e.g., at a kiosk), to provide access to an alternate version of the purchased asset. In these implementations, to limit the capturing of data from RFID tags imbedded in other assets, an RFID tag can be activated (for a limited number of uses), after an asset has been purchased. Additionally, to limit the capturing of data from RFID tags imbedded in other assets, the system can request an image of the receipt in addition to the scanning and activating of an RFID tag (e.g., post point of sale).

Figure 6:
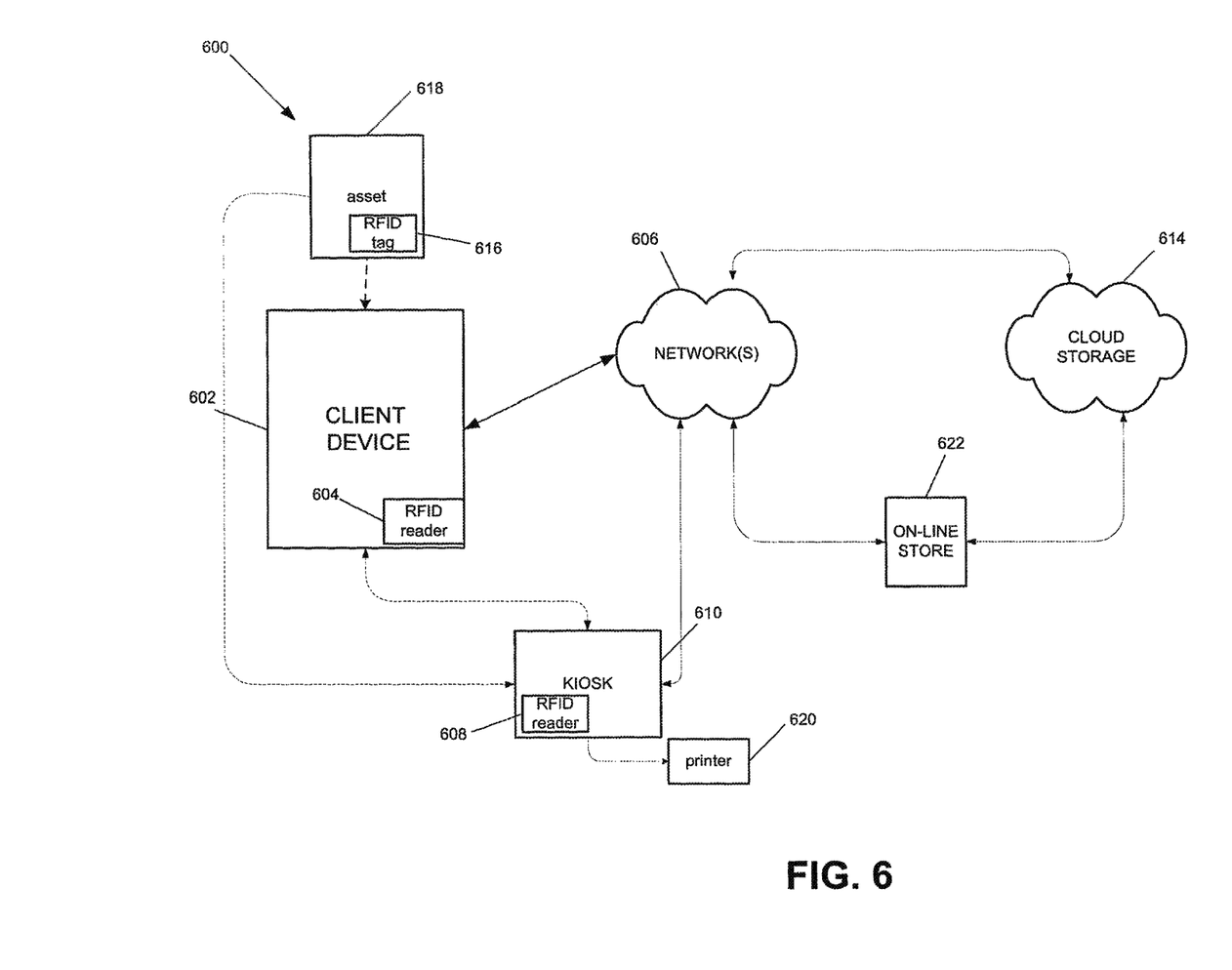
FIG. 6 shows an example system for acquiring data items from an on-line store using a kiosk.

FIG. 6 shows an example system 600 for acquiring data items from an on-line store using a kiosk. As noted above, a kiosk can be placed at a merchant location (e.g., an Apple™ store or a coffee shop). The kiosk can be used to facilitate acquisition of alternate versions of previously acquired assets using the methods described above.

System 600 includes client device 602. In addition to the elements of the client device described above, client device 602 further includes an RFID reader 604. RFID reader 604 can read RFID tags (e.g., sale identifiers), such as RFID tag 616 on asset 618 (e.g., a hard-copy of a book, CD, or DVD). In some implementations, an activated RFID tag can be read by a client device, and credit can be given for the asset in a digital content store (e.g., on-line store 622) by performing the method described above using network 606 and cloud storage 614. In some implementations, an activated RFID tag can include a unique data identifier (e.g., a tag ID) that can be used to confirm ownership and acquire alternate versions of an asset using the methods described above.

In some implementations, system 600 also includes kiosk 610 which includes RFID reader 608. RFID reader 608 can read RFID tags, such as RFID tag 616 on asset 618. Using the RFID information, kiosk 610 can confirm ownership of asset 618 and credit alternate versions of asset 618 using the methods described above. Alternate versions of asset 618 can be transmitted to client device 602 or any authorized client device (e.g., a device owned by the same user or user account).

In some implementations, RFID reader 604 on client device 602 can read and store RFID tag 616 information. Client device 602 can then transmit the stored RFID tag information to another RFID reader (e.g., RFID reader 608 on kiosk 610). For example, RFID information can be transmitted using a tap, a bump, or passing within a certain proximity of an RFID reader. Using the RFID information, kiosk 610 can confirm ownership of asset 618 and credit alternate versions of asset 618 using the methods described above. Thus, using an intermediary server, alternate versions of asset 618 can be transmitted to client device 602 or any authorized client device (e.g., a device owned by the same user or user account).

In some implementations, once ownership is confirmed, kiosk 610 can transmit a request to print (and bind) all or a portion of an asset using an associated printer (e.g., printer 620). Printer 620 can be associated with kiosk 610 using a wired or wireless connection. Kiosk 610 can also be associated with system 600 using a wired or wireless connection, such that a wired connection can be used when wi-fi is not available.

In some implementations, audio input can be used to confirm ownership. For example, the system can request that a passage from a random page or portion of an asset is read out loud. In some implementations, alternate forms of audio information can be used by the system to confirm ownership of an asset. For example, an asset can include an audio identification mechanism such as a perforation that represents an audio version of a binary encoding when torn. In another example, an asset can include an embedded chip (e.g., a piezoelectric device). Audio data (e.g., an identifiable chirp), generated using an embedded chip, can facilitate a peer-to-peer connection with the system. In some implementations, an asset can also include a photovoltaic device (e.g., a solar panel on the cover), that can be used to power one or more embedded chips. Using audio recognition techniques, the system can confirm ownership and provide alternate versions of an asset using the techniques described above.

In some implementations, alternate sensory input can be used to confirm ownership. For example, an asset can include one or more motion sensors and specific movement instructions for activating an asset and acquiring access to alternate versions of the asset (e.g., using one or more additional data identifiers). In another example, an asset can include a touch input that can be used to enter a unique data identifier (e.g., a touch ID) embedded in the asset. Correctly entering the touch ID using the touch input can cause the system to allow access to alternate versions of the asset.

In some implementations, a watermark can be imprinted into an asset using an ink that is only recognizable in a non-visible wavelength (e.g., infra-red or ultra-violet). In these implementations, an image of the watermark can be used to give credit for an alternate version of the asset using the techniques described above.

In some implementations, a perforated detachable card with a code to access a digital copy of an asset can be included with the asset (e.g., in the binding of a book or in the notes accompanying a CD or DVD). In these implementations, removal of the card can limit ownership confirmation, prevent access to alternate versions of the asset (e.g., an ePub version), and limit future owners to the hard-copy of the asset. A unique data identifier on the detachable card (e.g., a card ID) can also have limited use (e.g., valid for a limited amount of time or for a limited number of uses). The data on the detachable card can be used to give credit for an alternate version of the asset using the techniques described above.

In some implementations, one or more destructible elements can be included with an asset. Destruction of one or more of the destructible elements can prevent access to alternate versions of the asset. Example destructible elements include, but are not limited to, a unique data identifier in an ink (e.g., an ink ID), that fades when exposed to air, a unique data identifier that is embedded in an asset under a scratch off element (e.g., a scratch ID), or a unique data identifier that is under one or more glued pages ((e.g., a glued ID), that reveal a code or image when torn apart. In another example, an asset can be sealed with an element that must be destroyed to open the asset. In this example, the element can include a unique data identifier (e.g., a sealed ID), that is needed to access alternate version of the asset using the methods described above.

In some implementations, any combination of techniques described above can be used to confirm ownership and provide access to alternate versions of an asset.

Figure 7:
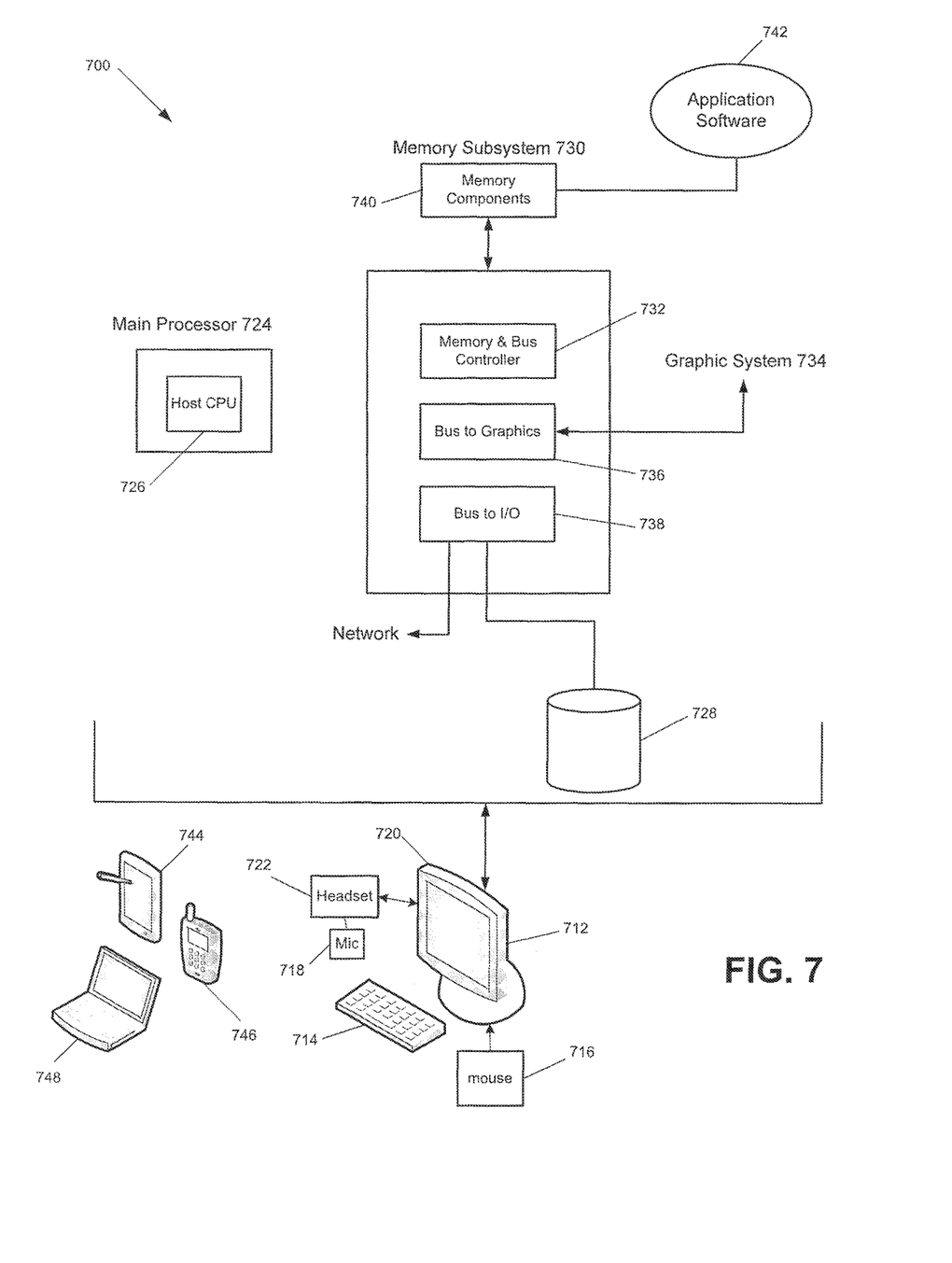
FIG. 7 is a block diagram of hardware which may be used to implement the various embodiments of the method of the present invention.

FIG. 7 is a block diagram of hardware 700 which can be used to implement the various embodiments of the method of the present invention. The hardware 700 can be a personal computer system (e.g., a desktop computing device 712, a laptop computing system 748, or a mobile computing system such as a tablet 744 or smart phone 746 computing system). Hardware 700 can include a desktop computing device 712 having as input devices such as keyboard 714, mouse 716, and microphone 718. Certain hardware 700 can be capable of receiving any combination of touch input, audio commands, or motion sensory commands (e.g., tablet 744 or smart phone 746). Output devices such as a monitor 720 and speakers 722 may also be provided. The reader will recognize that other types of input and output devices may be provided and that the present invention is not limited by the particular hardware configuration.

Computing system 712 can include a main processor 724 which is comprised of a host central processing unit 726 (CPU). Software applications 742, such as the method of the present invention, can be loaded from, for example, disk 728 (or other device), into main memory 740 from which the software application 742 can be run on the host CPU 726. The main processor 724 can operate in conjunction with a memory subsystem 730. The memory subsystem 730 can include main memory 740, which can be comprised of a number of memory components, and a memory and bus controller 732 which operates to control access to the main memory 740. The main memory 740 and controller 732 can be in communication with a graphics system 734 through a bus 736. Other buses may exist, such as a PCI bus 738, which interfaces to I/O devices or storage devices, such as disk 728 or a CDROM, or to provide network access.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus.

The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question (e.g., code that constitutes processor firmware, a protocol stack, a database management system, an operating system, or a combination of one or more of them). A propagated signal is an artificially generated signal (e.g., a machine-generated electrical, optical, or electromagnetic signal), that is generated to encode information for transmission to suitable receiver apparatus.

A computer program (also known as a program, software, software application, script, or code), can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device (e.g., a mobile telephone, a personal digital assistant (PDA), a mobile audio player, a Global Positioning System (GPS) receiver), to name just a few. Computer-readable media suitable for storing computer program instructions and data include all forms of nonvolatile memory, media, and memory devices, including by way of example semiconductor memory devices (e.g., EPROM, EEPROM, and flash memory devices), magnetic disks (e.g., internal hard disks or removable disks; magneto-optical disks), and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) to LCD (liquid crystal display) monitor), for displaying information to the user, and a keyboard and a pointing device (e.g., a mouse or a trackball), by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

Embodiments of the subject matter described in this specification can be implemented in a computing system that includes a back-end component (e.g., as a data server), or that includes a middleware component (e.g., an application server), or that includes a front-end component (e.g., a client computer having a graphical user interface), or a Web browser through which a user can interact with an implementation of the subject matter described in this specification, or any combination of one or more such back-end, middleware, or front-end components. The components of the system can be interconnected by any form or medium of digital data communication (e.g., a communication network). Examples of communication networks include a local area network ("LAN") and a wide area network ("WAN"), (e.g., the Internet).

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method, comprising:
    associating a unique identifier with an asset stored in one or more storage locations, wherein asset storage locations include local storage locations and remote storage locations;
    receiving a first request for an asset interaction with the asset, wherein the first request includes an alternate unique identifier of the asset, the alternate unique identifier corresponding to a physical copy of the asset;
    validating the first request, wherein the validating includes matching the alternate unique identifier to the unique identifier associated with the asset; and
    in accordance with a determination that the first request is validated,
        identifying whether an enhanced version of the asset that includes additional content distinct from content of the physical copy of the asset is available, wherein the enhanced version of the asset includes an upgrade corresponding to the quality of the asset or additional data associated with the asset, wherein the additional data is additional content that supplements the asset; and
        in accordance with a determination that the enhanced version of the asset is available:
            determining an asset storage location of the enhanced version of the asset distinct from the one or more storage locations of the asset; and
            granting the first request for an asset interaction, including, using the asset storage location, granting access to the enhanced version of the asset that includes additional content distinct from content of the physical copy of the asset; and
    after granting the first request for an asset interaction, receiving a second request for an asset interaction with the asset;
    in response to the second request, granting access to a respective asset storage location of the one or more storage locations of the asset, distinct from the asset storage location of the enhanced version of the asset.

2. The method of claim 1, wherein the alternate unique identifier corresponding to a physical copy of the asset comprises an identifier associated with a sale of the physical copy of the asset.

3. The method of claim 2, wherein the alternate unique identifier corresponding to a physical copy of the asset is generated from an image of the physical copy of the asset.

4. The method of claim 1, wherein the physical copy of the asset is a book and the alternate unique identifier is obtained from an image of a portion of the book.

5. The method of claim 1, wherein validating further comprises:
    activating and associating a sale identifier with the asset, wherein the association is for a duration of time; and
    matching the sale identifier to the unique identifier associated with the asset.

6. The method of claim 1, further comprising:
    receiving the first request from a kiosk;
    receiving a sale identifier from the kiosk;
    matching the sale identifier to the unique identifier associated with the asset; and
    transmitting a copy of the asset.

7. The method of claim 1, wherein validating further comprises:
    determining a geographical location corresponding to the first request.

8. The method of claim 1, wherein assets include media assets and multimedia assets.

9. The method of claim 1, including:
    in accordance with a determination that the first request is validated and that the enhanced version of the asset is not available,
    generating an enhanced version of the asset; and
    providing the enhanced version of the asset to a storage location.

10. A system, comprising:
    a processor;
    a non-transitory computer-readable storage medium containing instructions which when executed on the processor, cause the processor to perform operations including:
    associating a unique identifier with an asset stored in one or more storage locations, wherein asset storage locations include local storage locations and remote storage locations;
    receiving a first request for an asset interaction with the asset, wherein the first request includes an alternate unique identifier of the asset, the alternate unique identifier corresponding to a physical copy of the asset;
    validating the first request, wherein validating includes matching the alternate unique identifier to the unique identifier associated with the asset; and
    in accordance with a determination that the first request is validated,
        identifying whether an enhanced version of the asset that includes additional content distinct from content of the physical copy of the asset is available, wherein the enhanced version of the asset includes an upgrade corresponding to the quality of the asset or additional data associated with the asset, wherein the additional data is additional content that supplements the asset; and
        in accordance with a determination that the enhanced version of the asset is available:
            determining an asset storage location of the enhanced version of the asset distinct from the one or more storage locations of the asset; and
            granting the first request for an asset interaction, including, using the asset storage location, granting access to the enhanced version of the asset that includes additional content distinct from content of the physical copy of the asset; and after granting the first request for an asset interaction, receiving a second request for an asset interaction with the asset;

in response to the second request, granting access to a respective asset storage location of the one or more storage locations of the asset, distinct from the asset storage location of the enhanced version of the asset.

11. The system of claim 10, wherein the alternate unique identifier corresponding to a physical copy of the asset comprises an identifier associated with a sale of the physical copy of the asset.

12. The system of claim 11, wherein the alternate unique identifier corresponding to a physical copy of the asset is generated from an image of the physical copy of the asset.

13. The system of claim 10, wherein the physical copy of the asset is a book and the alternate unique identifier is obtained from an image of a portion of the book.

14. The system of claim 10, wherein validating further comprises:
activating and associating a sale identifier with the asset, wherein the association is for a duration of time; and
matching the sale identifier to the unique identifier associated with the asset.

15. The system of claim 10, further comprising instructions which when executed on the processor, cause the processor to perform operations including:
receiving the first request from a kiosk;
receiving a sale identifier from the kiosk;
matching the sale identifier to the unique identifier associated with the asset; and
transmitting a copy of the asset.

16. The system of claim 10, wherein validating further comprises:
determining a geographical location corresponding to the first request.

17. The system of claim 10, wherein assets include media assets and multimedia assets.

18. The system of claim 10, further comprising instructions which when executed on the processor, cause the processor to perform operations including:
in accordance with a determination that the first request is validated and that the enhanced version of the asset is not available,
generate an enhanced version of the asset; and
provide the enhanced version of the asset to a storage location.

19. A computer-program product tangibly embodied in a machine-readable non-transitory storage medium, including instructions configured to cause a data processing system to:
associate a unique identifier with an asset stored in one or more storage locations, wherein asset storage locations include local storage locations and remote storage locations;
receive a first request for an asset interaction with the asset, wherein the first request includes an alternate unique identifier of the asset, the alternate unique identifier corresponding to a physical copy of the asset;
validate the first request, wherein validating includes matching the alternate unique identifier to the unique identifier associated with the asset;
and
in accordance with a determination that the first request is validated,
identify whether an enhanced version of the asset that includes additional content distinct from content of the physical copy of the asset is available, wherein the enhanced version of the asset includes an upgrade corresponding to the quality of the asset or additional data associated with the asset, wherein the additional data is additional content that supplements the asset; and
in accordance with a determination that the enhanced version of the asset is available:
determine an asset storage location of the enhanced version of the asset distinct from the one or more storage locations of the asset; and
grant the first request for an asset interaction, including, using the asset storage location, granting access to the enhanced version of the asset that includes additional content distinct from content of the physical copy of the asset, and
after granting the first request for an asset interaction, receiving a second request for an asset interaction with the asset;
in response to the second request, granting access to a respective asset storage location of the one or more storage locations of the asset, distinct from the asset storage location of the enhanced version of the asset.

20. The computer-program product of claim 19, wherein the alternate unique identifier corresponding to a physical copy of the asset comprises an identifier associated with a sale of the physical copy of the asset.

21. The computer-program product of claim 20, wherein the alternate unique identifier corresponding to a physical copy of the asset is generated from an image of the physical copy of the asset.

22. The computer-program product of claim 19, wherein the physical copy of the asset is a book and the alternate unique identifier is obtained from an image of a portion of the book.

23. The computer-program product of claim 19, wherein validating further comprises:
activating and associating a sale identifier with the asset, wherein the association is for a duration of time; and
matching the sale identifier to the unique identifier associated with the asset.

24. The computer-program product of claim 19, further comprising instructions configured to cause the data processing system to:
receive the first request from a kiosk;
receive a sale identifier from the kiosk;
match the sale identifier to the unique identifier associated with the asset; and
transmit a copy of the asset.

25. The computer-program product of claim 19, wherein validating further comprises:
determining a geographical location corresponding to the first request.

26. The computer-program product of claim 19, wherein assets include media assets and multimedia assets.

27. The computer-program product of claim 19, further comprising instructions configured to cause the data processing system to:
in accordance with a determination that the first request is validated and that the enhanced version of the asset is not available,
generate an enhanced version of the asset; and
provide the enhanced version of the asset to a storage location.

* * * * *